(12) United States Patent
Olsen et al.

(10) Patent No.: US 10,907,326 B2
(45) Date of Patent: Feb. 2, 2021

(54) VISION SYSTEM FOR MONITORING A WORK TOOL OF A WORK VEHICLE

(71) Applicant: Deere & Company, Moline, IL (US)

(72) Inventors: Trae Daniel Olsen, Concord, NC (US); Benjamin J. Oppelt, Dubuque, IA (US); Kevin D. Bellows, Summerfield, NC (US)

(73) Assignee: Deere & Company, Moline, IL (US)

( * ) Notice: Subject to any disclaimer, the term of this patent is extended or adjusted under 35 U.S.C. 154(b) by 240 days.

(21) Appl. No.: 15/950,711

(22) Filed: Apr. 11, 2018

(65) Prior Publication Data
US 2019/0048559 A1    Feb. 14, 2019

Related U.S. Application Data

(60) Provisional application No. 62/544,020, filed on Aug. 11, 2017.

(51) Int. Cl.
*B60R 11/04* (2006.01)
*E02F 9/26* (2006.01)
(Continued)

(52) U.S. Cl.
CPC .............. *E02F 9/264* (2013.01); *B60R 11/04* (2013.01); *E02F 3/32* (2013.01); *H04N 7/183* (2013.01);
(Continued)

(58) Field of Classification Search
CPC ............. B60R 11/04; B60R 2011/0092; B60R 2300/101; E02F 3/32; E02F 3/325;
(Continued)

(56) References Cited

U.S. PATENT DOCUMENTS 6,363,906 B1   4/2002   Thompson et al.
6,371,889 B1   4/2002   Kuroda et al.
(Continued)

FOREIGN PATENT DOCUMENTS

| CA | 2742335 C | 12/2012 | |
|----|-----------|---------|---|
| FR | 2076504 A5 * | 10/1971 | ............. E02F 9/264 |

(Continued)

OTHER PUBLICATIONS

"Mazda i-stop engine-idling-stop system wins another major award", New Atlas Automotive, Available at http://newatlas.aom/mazda-i-stop-engine-idling-stop-system-wins-Ichimura-industrial-award/14896/, Aug. 12, 2016.

(Continued)

*Primary Examiner* — Saul Rodriguez
*Assistant Examiner* — Brendan P Tighe
(74) *Attorney, Agent, or Firm* — Kilpatrick Townsend & Stockton LLP

(57) ABSTRACT

A work tool of a work vehicle can be monitored using a vision system. In some examples, the vision system can include a camera for capturing images of an area that includes at least a portion of the work tool of the work vehicle. The camera can then transmit the images to a display that is positioned so as to be viewable by an operator of the work vehicle. The display can receive the images and display the images. The operator can view the images on the display and take corrective action to avoid unintentionally damaging the work vehicle or other objects.

20 Claims, 13 Drawing Sheets

(51) Int. Cl.
*E02F 3/32* (2006.01)
*H04N 7/18* (2006.01)

(52) U.S. Cl.
CPC ..... *B60K 2370/21* (2019.05); *B60R 2300/101* (2013.01)

(58) Field of Classification Search
CPC .......... E02F 9/261; E02F 9/264; H04N 7/183; B60K 2370/21
See application file for complete search history.

(56) References Cited

U.S. PATENT DOCUMENTS

| | | |
|---|---|---|
| 6,694,240 B1 | 2/2004 | Swick et al. |
| 6,701,081 B1 * | 3/2004 | Dwyer ................... G03B 41/00 396/329 |
| 6,735,888 B2 | 5/2004 | Green et al. |
| 7,098,549 B2 | 8/2006 | Asakage et al. |
| 7,606,648 B2 | 10/2009 | Shepherd et al. |
| 7,626,491 B2 | 12/2009 | Yamada et al. |
| 7,669,354 B2 | 3/2010 | Aebischer et al. |
| 7,702,450 B2 | 4/2010 | Pfohl et al. |
| 8,323,152 B2 | 12/2012 | Albrecht |
| 8,326,520 B2 | 12/2012 | Bollig et al. |
| 8,346,457 B2 | 1/2013 | Herbolzheimer |
| 8,348,808 B2 | 1/2013 | Bollig et al. |
| 8,405,721 B2 | 3/2013 | Bilandi et al. |
| 8,452,523 B2 | 5/2013 | Nitz et al. |
| 8,843,279 B2 | 9/2014 | Bilandi et al. |
| 9,418,309 B2 | 8/2016 | Bilandi et al. |
| 9,644,345 B2 | 5/2017 | Friebel |
| 2005/0001606 A1 | 1/2005 | Kagoshima |
| 2005/0131622 A1 | 6/2005 | Braun et al. |
| 2005/0150142 A1 | 7/2005 | Matsuda et al. |
| 2009/0043429 A1 | 2/2009 | Minekawa |
| 2010/0064677 A1 | 3/2010 | Kawaguchi et al. |
| 2010/0152995 A1 | 6/2010 | Baumann et al. |
| 2010/0222991 A1 | 9/2010 | Berr |
| 2011/0002765 A1 | 1/2011 | Asam et al. |
| 2011/0077828 A1 | 3/2011 | Matsuda et al. |
| 2012/0003069 A1 | 1/2012 | Hagiwara et al. |
| 2013/0174539 A1 | 7/2013 | Ezawa et al. |
| 2014/0008140 A1 | 1/2014 | Yoshida et al. |
| 2014/0303879 A1 | 10/2014 | Hyodo et al. |
| 2014/0350775 A1 | 11/2014 | Yagi et al. |
| 2015/0025753 A1 | 1/2015 | Mori et al. |
| 2015/0032314 A1 | 1/2015 | Kitamura |
| 2015/0039187 A1 | 2/2015 | Friebel |
| 2017/0138017 A1 * | 5/2017 | Halepatali ............... E02F 9/261 |
| 2020/0032487 A1 * | 1/2020 | Zieser ....................... B60R 1/00 |

FOREIGN PATENT DOCUMENTS

| | | |
|---|---|---|
| GB | 2424964 | 5/2007 |
| JP | 2004300947 | 10/2004 |
| WO | 85/03096 A1 | 7/1985 |
| WO | 2011018340 | 2/2011 |

OTHER PUBLICATIONS

Mazda3 iStop puts engine in pause mode, New Atlas Automotive, Available at http://newatlas.com/mazda3-istop/12118/, Aug. 12, 2016.
"Stop? Pause? A distinction without a difference with Mazda iStop", Available at http://www.autoblog.com/2009/07/03/stop-pause-a-distinction-without-a-difference-with-mazda-istop, Aug. 12, 2016.
U.S. Appl. No. 13/958,659 , "Advisory Action", dated Oct. 9, 2015, 3 pages.
U.S. Appl. No. 13/958,659 , "Final Office Action", dated Aug. 6, 2015, 32 pages.
U.S. Appl. No. 13/958,659 , "Non-Final Office Action", dated Apr. 17, 2015, 19 pages.
U.S. Appl. No. 13/958,659 , "Notice of Allowance", dated Jan. 19, 2017, 10 pages.
U.S. Appl. No. 13/958,659 , "Notice of Allowance", dated Jun. 6, 2016, 17 pages.
U.S. Appl. No. 13/958,659 , "Restriction Requirement", dated Feb. 5, 2015, 13 pages.

* cited by examiner

VISION SYSTEM FOR MONITORING A WORK TOOL OF A WORK VEHICLE

REFERENCE TO RELATED APPLICATION

This claims the benefit of priority under 35 U.S.C. § 119(e) to U.S. Provisional Patent Application No. 62/544,020, titled "Vision System for Monitoring a Work Tool of a Work Vehicle" and filed Aug. 11, 2017, the entirety of which is hereby incorporated by reference herein.

FIELD OF THE DISCLOSURE

The present disclosure relates generally to work vehicles. More specifically, but not by way of limitation, this disclosure relates to a vision system for monitoring a work tool of a work vehicle.

BACKGROUND

A work vehicle, such as an excavator, can be used to perform a variety of tasks at a construction site. For example, an operator of an excavator can use the excavator to dig holes or move dirt at a construction site. But the operator's field of view can become obstructed while the operator uses the work vehicle. For example, a deep trench, a pile of dirt, or the sides/sideboards of a dump truck can obstruct the operator's field of view, preventing the operator from seeing underground obstructions (e.g., pipes, gas lines, etc.), the inside of hauling equipment, or other workers. This can create hazardous conditions or otherwise impede the operator's ability to perform a task.

SUMMARY

In one example, a work vehicle of the present disclosure can include a work tool coupled to a main body of the work vehicle by a connector component. The work vehicle can include a camera configured to capture images of an area that includes at least a portion of the work tool and transmit the images. The camera can be positioned on an external surface of the connector component of the work vehicle. The work vehicle can include a display configured to receive the images from the camera and display the images. The display can be positioned to be viewable by an operator of the work vehicle. In some examples, the work vehicle is an excavator, the work tool is a bucket, the connector component is a boom or a dipper stick, and the at least a portion of the work tool includes the bucket. In some examples, the display is positioned in a cab of the work vehicle or on a rollover protection structure. In some examples, the work vehicle includes a mounting device for removably coupling the camera to the connector component. The mounting device can be configurable to adjust a location of the camera along the connector component. In some examples, the work vehicle can include a mounting device for coupling the camera to the connector component. The mounting device can be operable to adjust (i) an orientation of the camera, or (ii) a location of the camera along the connector component. In some examples, the mounting device is electronically controllable by a control unit for manipulating the orientation of the camera or the location along the connector component of the camera. In some examples, the display is the control unit. The display can include a touch-screen display for receiving user input and responsively controlling the orientation or location of the camera. In some examples, an entire body of the camera is positioned externally to the external surface of the connector component. A lens of the camera can be oriented to capture images of the work tool. In some examples, the entire body of the camera is positioned beneath a continuous plane between at least two points on the external surface of the connector component. A first point of the at least two points can be at a first end of the connector component and a second point of the at least two points can be at a second end of the connector component, the second end being opposite to the first end. In some examples, the camera is configured to transmit the images to the display via a wireless interface.

In another example, a vision system of the present disclosure can include a camera configured to capture images of an area that includes at least a portion of a work tool of a work vehicle and transmit the image. The camera can be positionable on an external surface of the work vehicle. The vision system can include a display configured to receive the images from the camera and display the images. The display can be positionable so as to be viewable by an operator of the work vehicle. The vision system can include a mounting device configured to mount the camera to the external surface of the work vehicle. In some examples, the work vehicle is an excavator, the work tool is a bucket, and the at least a portion of the work tool includes the bucket. In some examples, the mounting device is configured for removably coupling the camera to a connector component of the work vehicle. The mounting device can be configurable to adjust a location of the camera along the connector component. In some example, the mounting device is operable to adjust (i) an orientation of the camera, or (ii) a location of the camera along a connector component between the work tool and a body of the work vehicle. In some examples, the vision system can include a control unit configured to electronically control the mounting device to manipulate the orientation of the camera. In some examples, the display is the control unit. The display can include a touch-screen display for receiving user input and responsively controlling the orientation of the camera. In some examples, an entire body of the camera is positioned externally to an external surface of a connector component that is positioned between the work tool and a body of the work vehicle. In some examples, the entire body of the camera is positioned beneath a continuous plane between at least two points on the external surface of the connector component. A first point of the at least two points can be at a first end of the connector component and a second point of the at least two points can be at a second end of the connector component, the second end being opposite to the first end.

In yet another example, a method of the present disclosure can include capturing images, by a camera positioned on an external surface of a work vehicle, of an area that includes at least a portion of a work tool of the work vehicle. The method can include transmitting, by the camera, the images via a communications interface to a display positioned on the work vehicle so as to be viewable by an operator of the work vehicle. The method can include receiving and displaying, by the display, the images from the camera.

In some examples, the method can include transmitting, by a control unit, an electrical signal to a mounting device that is physically attaching the camera to a connector component between the work tool and a body of the work vehicle. The method can include receiving, by the mounting device, the electrical signal. The method can include adjusting, by the mounting device, an orientation of the camera in response to the electrical signal.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DETAILED DESCRIPTION

Figure 1:
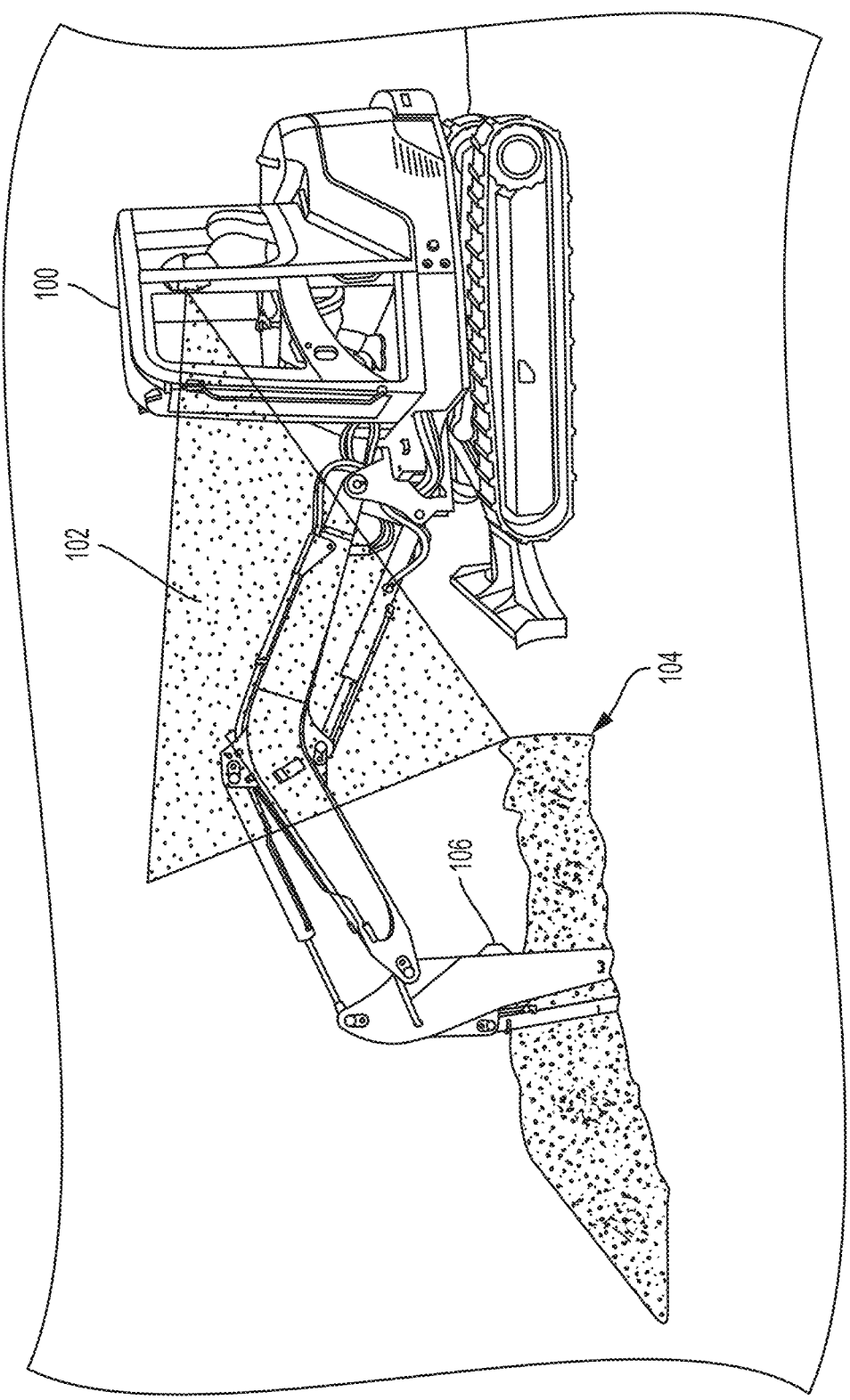
FIG. 1 shows an example of a vision system that can mitigate issues resulting from an operator's field of view being blocked by an edge of a ditch or trench while using a work vehicle according to some aspects.

Certain aspects and features of the present disclosure relate to a vision system for monitoring an area that is proximate to a work tool of a work vehicle, such as an excavator, backhoe loader, bulldozer, harvester, or paver. The vision system can include a camera in communication with a display. The camera can be positioned on the work vehicle for capturing images of the work tool (e.g., a bucket, grapple, auger, ripper, compactor, hammer, shear, or other attachment for performing one or more tasks). The camera can additionally or alternatively capture images of the area surrounding the work tool. The camera can communicate the images via a wired or wireless interface to the display. The display can be positioned in a cab of the work vehicle or elsewhere such that it is visible to an operator of the work vehicle. The vision system can enable the operator of the work vehicle to view objects (e.g., underground utilities, other pieces of equipment, or other workers) that may otherwise be obstructed from the operator's field of view. This can prevent the objects from being unintentionally damaged while the operator uses the work vehicle. This can also prevent the work vehicle from being unintentionally damaged by impacts with the objects.

The location and orientation of the camera can be permanently fixed or adjustable. In one example, the camera can be permanently fixed in a single position on the work tool or elsewhere on the work vehicle. In another example, the camera can be removably coupled to the work tool so that the camera can be manually positioned and repositioned as needed by the operator. In some examples, the camera can be coupled to the work vehicle via an electronically controlled mounting device that can physically rotate the camera, translate the camera, or both in response to electrical signals from a control unit. The control unit can be in communication with the electrically controlled mounting device and include at least one manipulandum (e.g., touchscreen display, touch pad, joystick, button, switch, or any combination of these) for receiving user input from the operator. The control unit can detect the user input and responsively transmit the electrical signals to the electronically controlled mounting device to rotate or translate the camera.

More particularly, some examples of the present disclosure can include a vision system for monitoring a bucket, attachment, or other work tool attached to a work vehicle (e.g., a hydraulic excavator). The vision system can include any combination of (i) a camera, such as a video camera; (ii) a mounting device for affixing the camera to a component associated with the work vehicle; (iii) a display or monitor used for viewing images captured from the camera; and (iv) a communication device for transmitting signals from the camera to the display. The communication device can be a wired or a wireless interface, as discussed in greater detail below.

In some examples, the camera can be mounted on an arm of the work vehicle, including the lower surface, upper surface, or sides of the arm structure used to support the bucket, attachment, or other work tool or device used during operation of the work vehicle. Alternatively, the camera can be mounted on a boom of the work vehicle, including the lower surface, upper surface, or sides of the boom that is commonly used to support the arm and is attached to the main body of the work vehicle. In other examples, the camera can be mounted on the cab facing forwards toward the bucket, attachment, or other work tool. For example, the camera can be mounted on the front surface of the cab or the top surface (e.g., roof) of the cab. The camera can transmit images (or video signals) wirelessly to a display or though wiring that extends along an arm, boom, or other frame structure of the work vehicle to the display.

The display can be positioned in the cab or elsewhere on the work vehicle. The display can be positioned so as to be viewable by the operator while the operator manipulates the work vehicle's controls to perform a task. And the display can be positioned so as not to hinder the opening or closing of any latches, hatches, windows, or doors in the cab. In some examples, the display can be mounted on the exterior of the cab, such as to a rollover protection structure (ROPS), via a mounting device. This can enable the operator to view the display while operating the controls of the work vehicle. In other examples, the display can be positioned in the cab, for example, by using a vertical support pillar that forms the structure of the ROPS. The vertical support pillar can be located in front of the operator or behind the operator while the operator is seated in the cab. Additionally or alternatively, the display can be positioned in the cab using a cross member that spans across a vertical support pillar. The cross member can be positioned in front of, behind, or on the sides of the operator while the operator is seated in the cab. The display can additionally or alternatively be positioned on a supporting structure inside the cab for the controls (e.g., pilot controls) used to operate the work vehicle. The controls can control the rotation of the work vehicle; the boom, arm, or work tool; or any combination of these. In some examples, the display can be an existing monitor in the work vehicle that typically shows other information, such as operating parameters (e.g., engine speed, fuel level, and engine temperature) of the work vehicle. In such an example, the monitor may be modified to perform the functionality of the display.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 shows an example of a vision system 106 that can mitigate issues resulting from an operator's field of view 102 being blocked by an edge of a ditch or trench while using a work vehicle 100 according to some aspects. The edge of the ditch or trench can be referred to as an obstruction 104. An obstruction can be anything that blocks at least a portion of the field of view of the operator while the work vehicle 100 is swinging, digging, unloading material, or performing another task. The vision system 106 can enable the operator to view an area obscured by the obstruction 104, as discussed in greater detail below.

Figure 2:
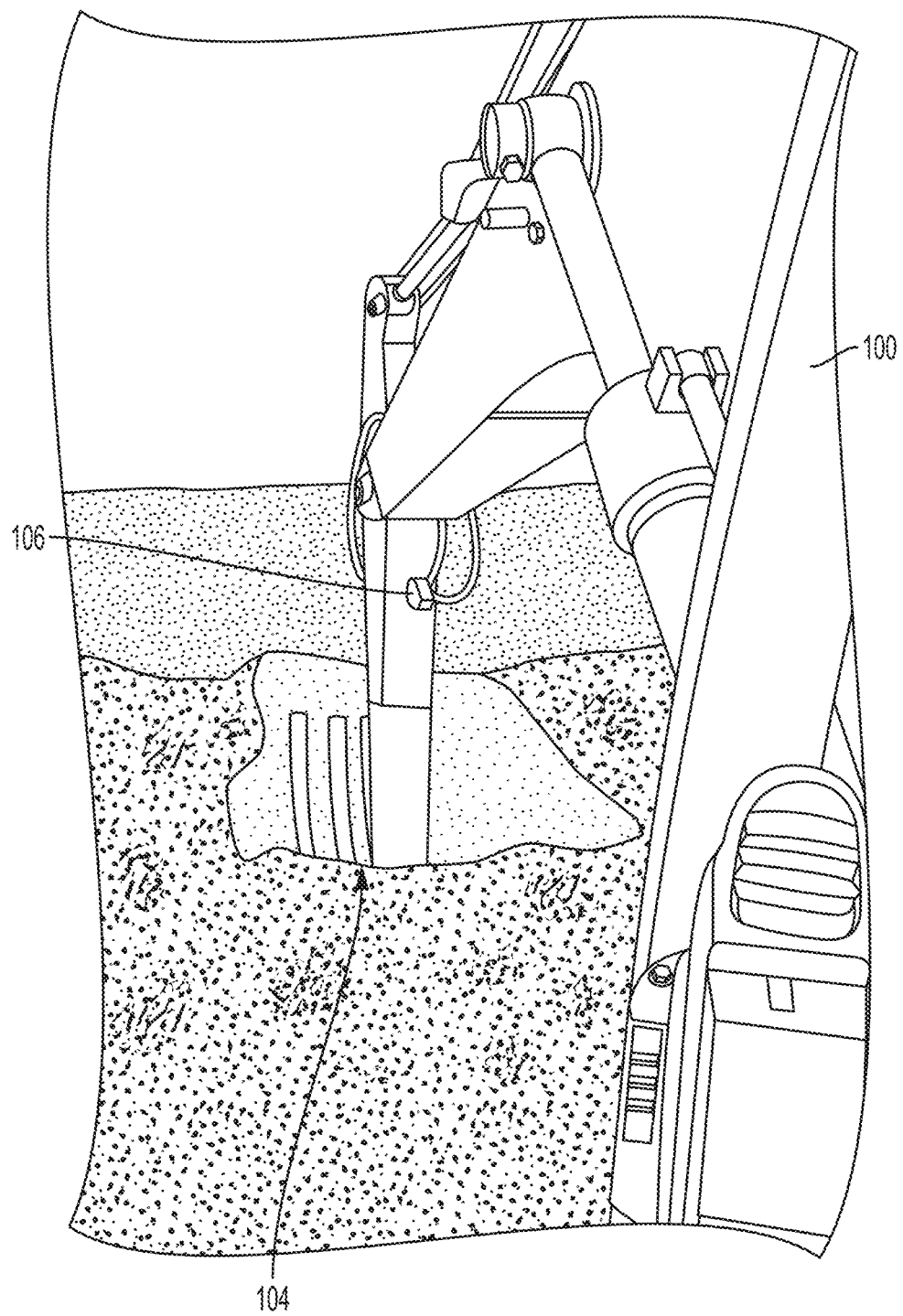
FIG. 2 shows another example of a vision system that can mitigate issues resulting from an operator's field of view being blocked by an edge of a ditch or trench while using a work vehicle according to some aspects.
Figure 3:
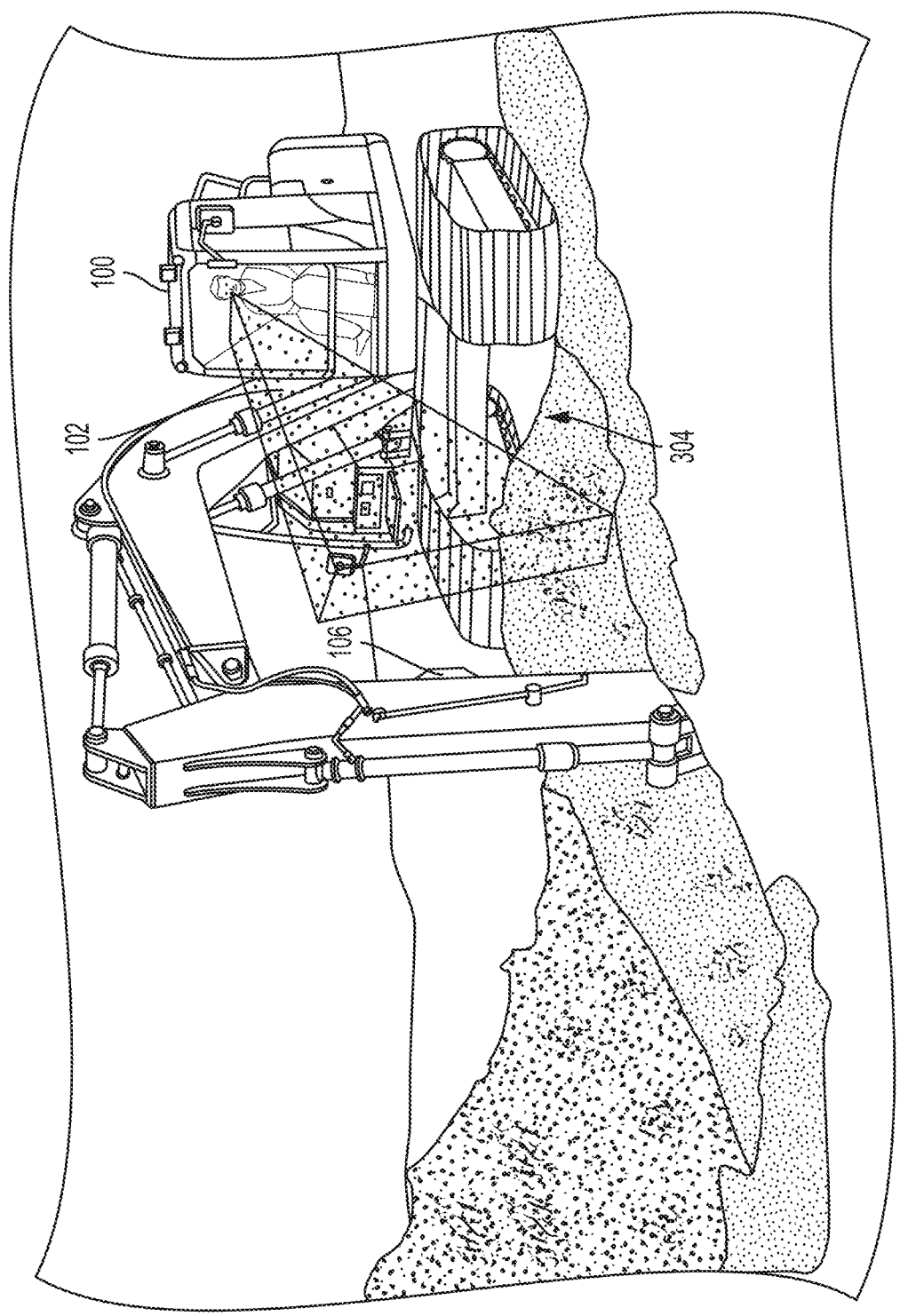
FIG. 3 shows an example of a vision system that can mitigate issues resulting from an operator's field of view being blocked by a pile of dirt while using a work vehicle according to some aspects.
Figure 4:
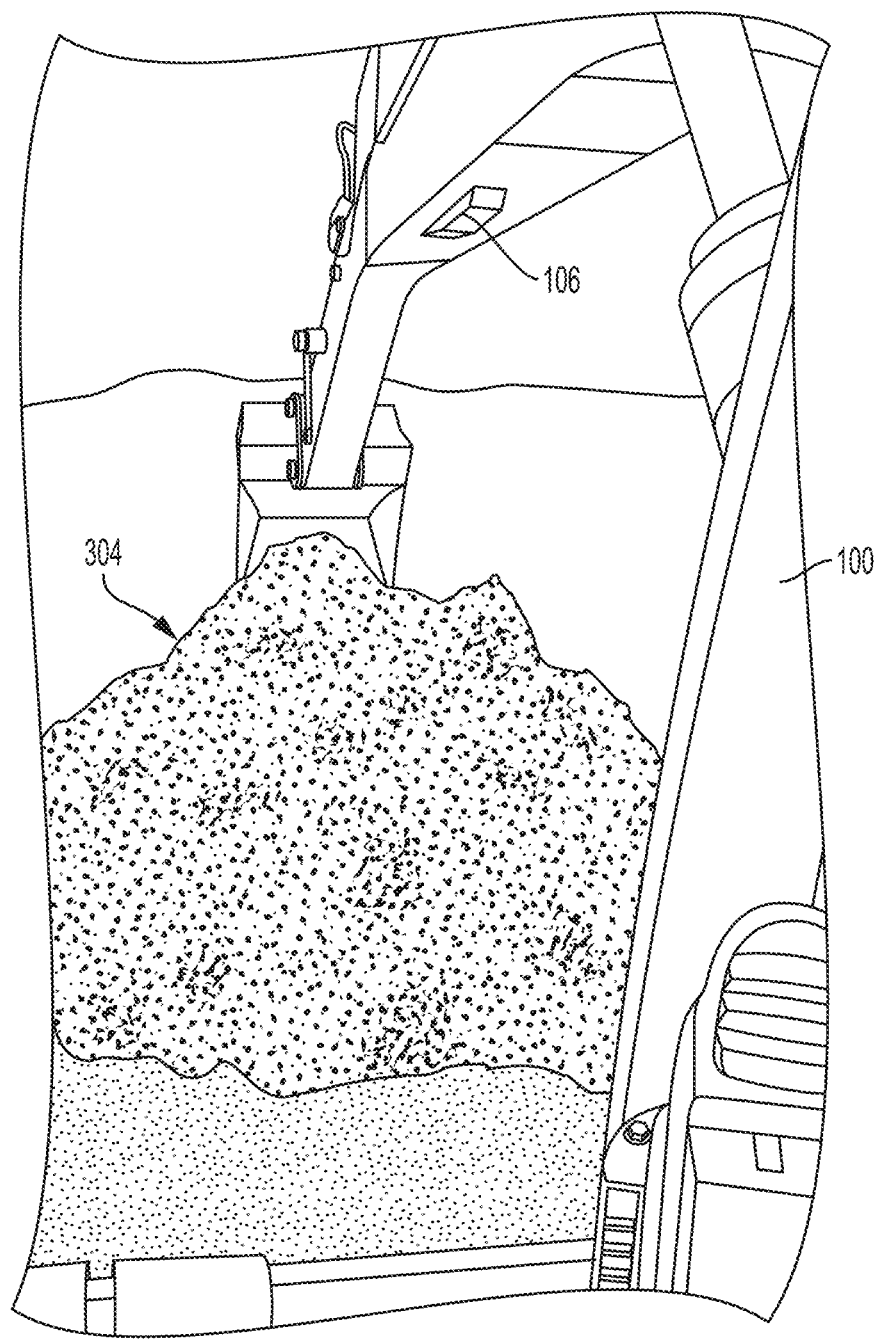
FIG. 4 shows another example of a vision system that can mitigate issues resulting from an operator's field of view being blocked by a pile of dirt while using a work vehicle according to some aspects.
Figure 5:
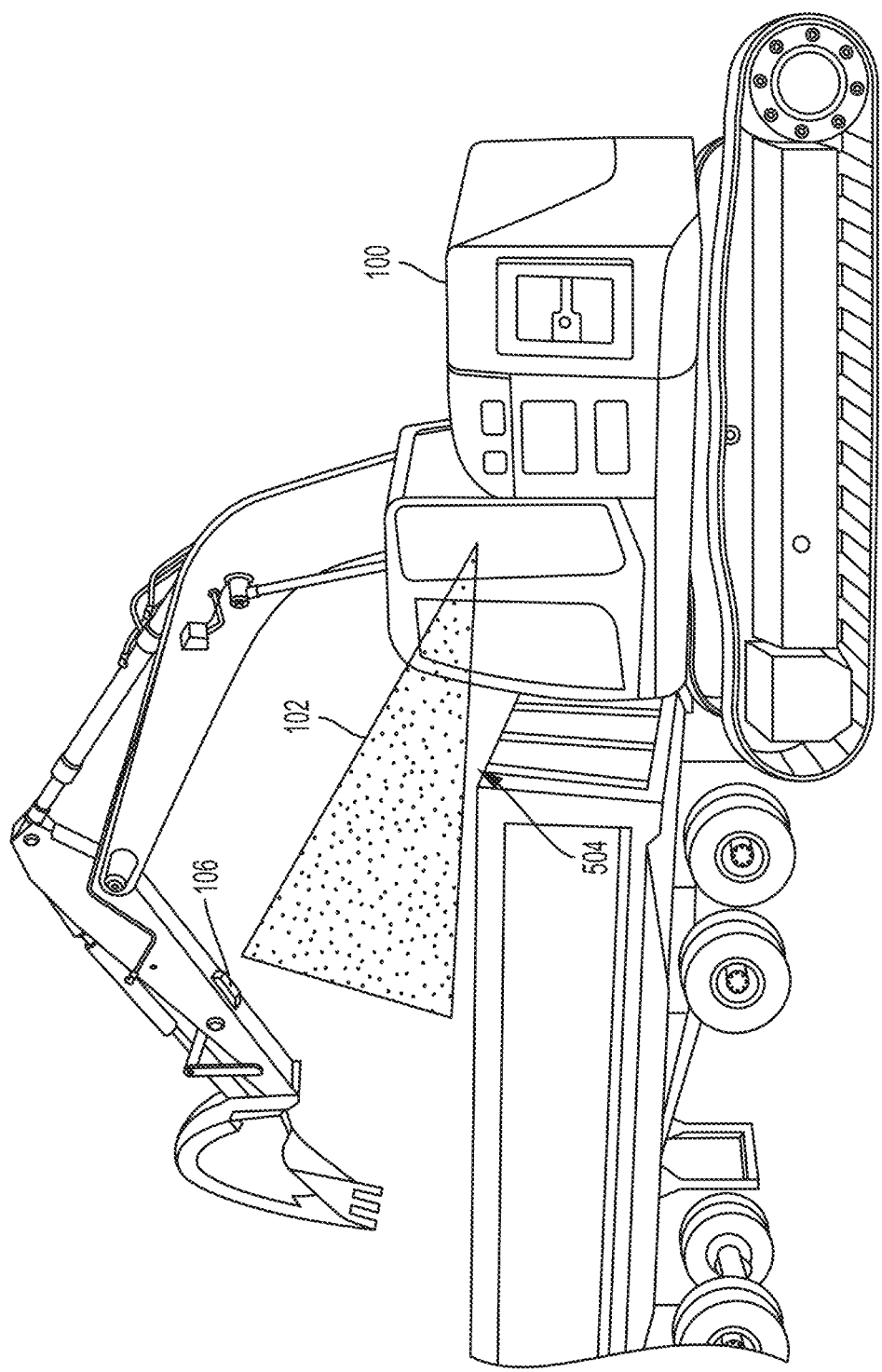
FIG. 5 shows an example of a vision system that can mitigate issues resulting from an operator's field of view being blocked by an edge of a container while using a work vehicle according to some aspects.

FIGS. 2-5 show other examples of a vision system 106 that can mitigate issues resulting from an operator's field of view 102 being blocked by various obstructions 104, 304, 504. In FIG. 2, the obstruction 104 is an edge of a trench or ditch, which can prevent the operator from seeing into the trench or ditch to identify potential hazards while using the work vehicle 100. In FIGS. 3-4, the obstruction 304 is a pile of dirt, which can limit the operator's field of view 102. This can prevent the operator from seeing other workers or potential hazards behind the pile of dirt while using the work vehicle 100. In FIG. 5, the obstruction 504 is an edge of a container (e.g., on a truck used to remove material from a construction site) that limits the field of view 102 of the operator of the work vehicle 100. Some or all of these obstructions can prevent the operator from viewing the end of a work tool or an area proximate to the work tool. Typically, this may result in the operator unintentionally harming underground utilities, other pieces of equipment, or the work vehicle 100. But some examples of the present disclosure can overcome one or more of the abovementioned issues by providing the vision system 106 to enable an operator of a work vehicle to monitor the area proximate to the work tool of the work vehicle 100. One example of the vision system is discussed below with respect to FIG. 6.

Figure 6:
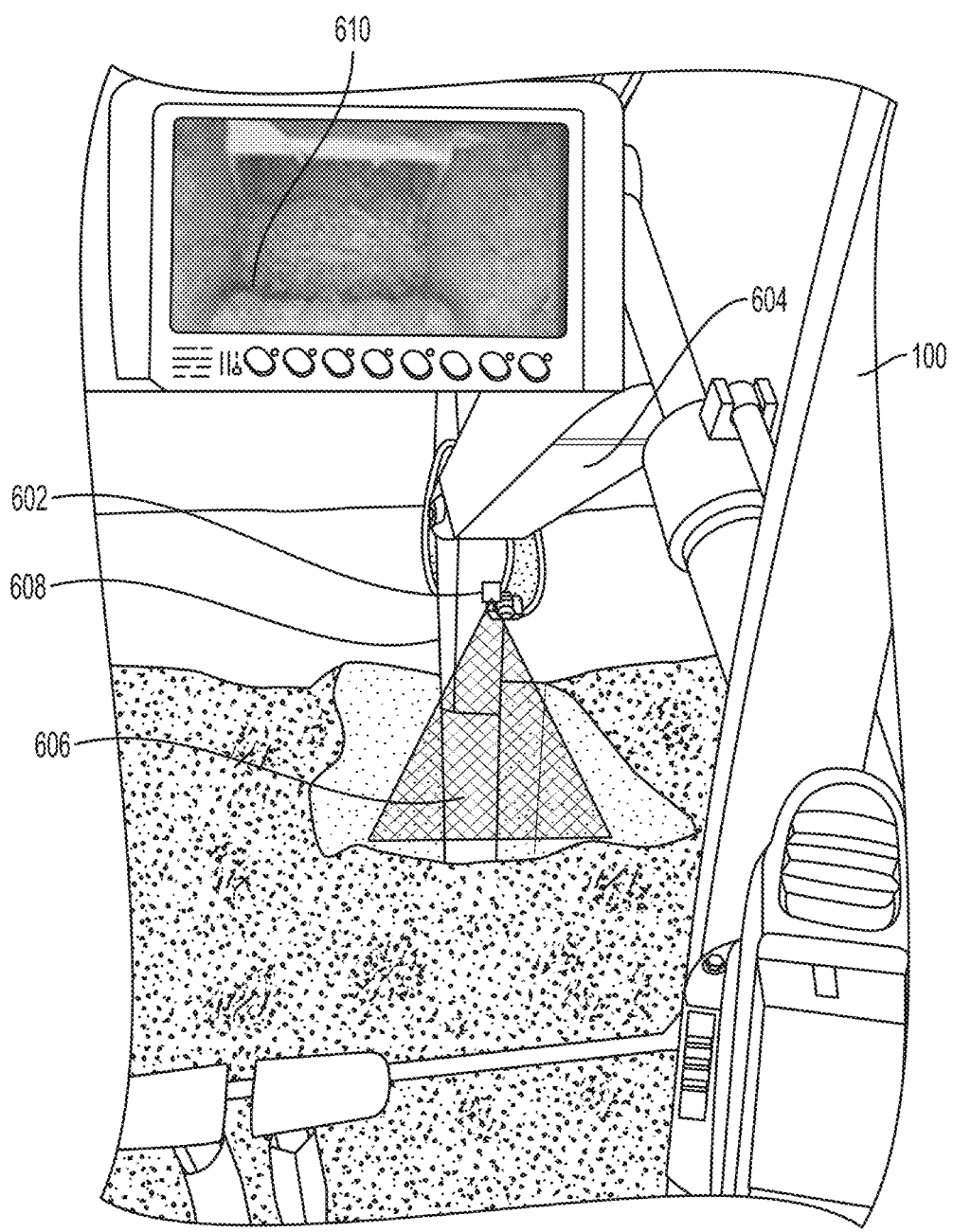
FIG. 6 shows an example of a vision system mounted on a work vehicle according to some aspects.

In FIG. 6, work vehicle 100 has a vision system that includes a camera 602 and a display 610. The camera 602 can be positioned on the boom, arm, or dipper stick 608 of the work vehicle 100; on the work tool of the work vehicle 100; on or inside the cab of the work vehicle 100; or elsewhere on the work vehicle 100. In some examples, the camera 602 is positioned on an external surface of the work vehicle 100. For example, the camera 602 can be mounted to an underside of a dipperstick (or boom) such that the camera 602 is positioned entirely outside the dipperstick (or boom). As a more specific example, the camera 602 can be positioned on an external surface of the metal housing 604 that forms the dipper stick 608 (or boom), such that no portion of the camera 602 protrudes into an interior portion of the metal housing 604 of the dipper stick (or boom).

The camera 602 is positioned to capture images of an area 606 that includes the work tool, is proximate to the work tool, or both. In the example shown in FIG. 6, the camera 602 is positioned to look downwardly into the ditch to enable an operator of the work vehicle 100 to see the work tool's positioning in the ditch. An example of the area 606 captured by the camera 602 is shown on the display 610.

The camera 602 can communicate images to the display 610 via a communication interface that can be wired or wireless. Examples of a wired communication-interface can include Ethernet, USB, and IEEE 1394. Examples of wireless communication-interfaces can include IEEE 802.11, Bluetooth, near-field communication (NFC) interfaces, or radio interfaces for accessing cellular telephone networks (e.g., transceiver/antenna for accessing a CDMA, GSM, UMTS, or other mobile communications network).

Although the display 610 in FIG. 6 is positioned on the work vehicle 100 in this example, in other examples the display 610 can be positioned at another location. And the camera 602 can transmit (e.g., wirelessly) the images to the display 610 at that location. For example, the display 610 can be positioned offsite (e.g., elsewhere from the construction site), such as at a head office or factory. This can enable personnel other than the work vehicle's operator to, for example, identify and troubleshoot issues. Examples of such personnel can include an equipment manager, job foreman, or technical personnel.

In some examples, the vision system can include at least two displays. A first display can be positioned in the work vehicle's cab for use by the work vehicle's operator. A second display can be positioned at another location for use by other personnel. The camera 602 can transmit the images to both displays (e.g., concurrently). This can enable the work vehicle's operator and other personnel to both monitor the outputs from the camera 602.

Figure 7:
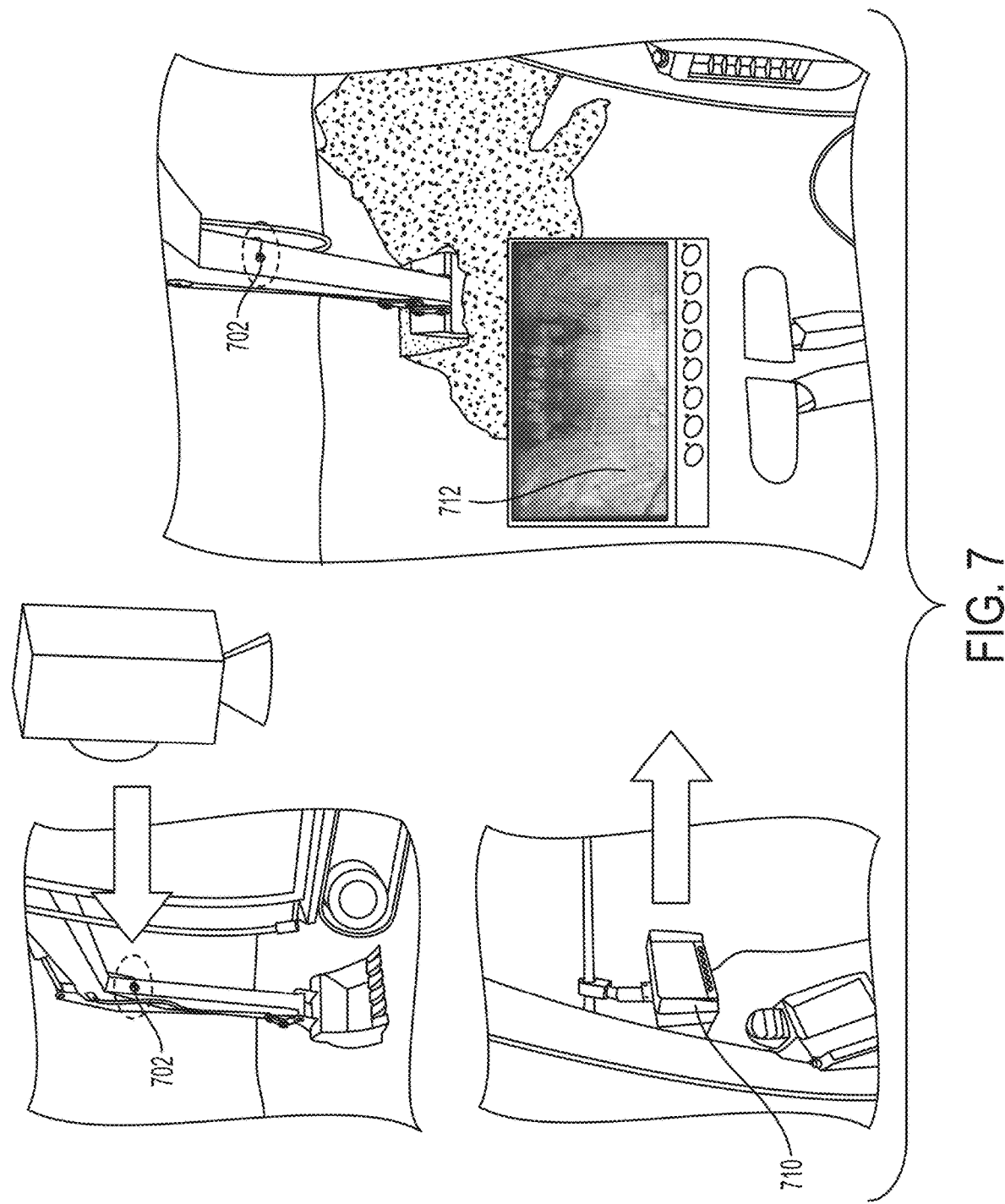
FIG. 7 shows other examples of a vision system mounted on a work vehicle according to some aspects.

FIG. 7 shows other examples of a vision system mounted on a work vehicle according to some aspects. In this example, the camera 702 is mounted on the dipper stick of an excavator, and the display 710 is mounted within a cab of the work vehicle. An example of the area 712 captured by the camera 702 is shown on the display 710.

Figure 8:
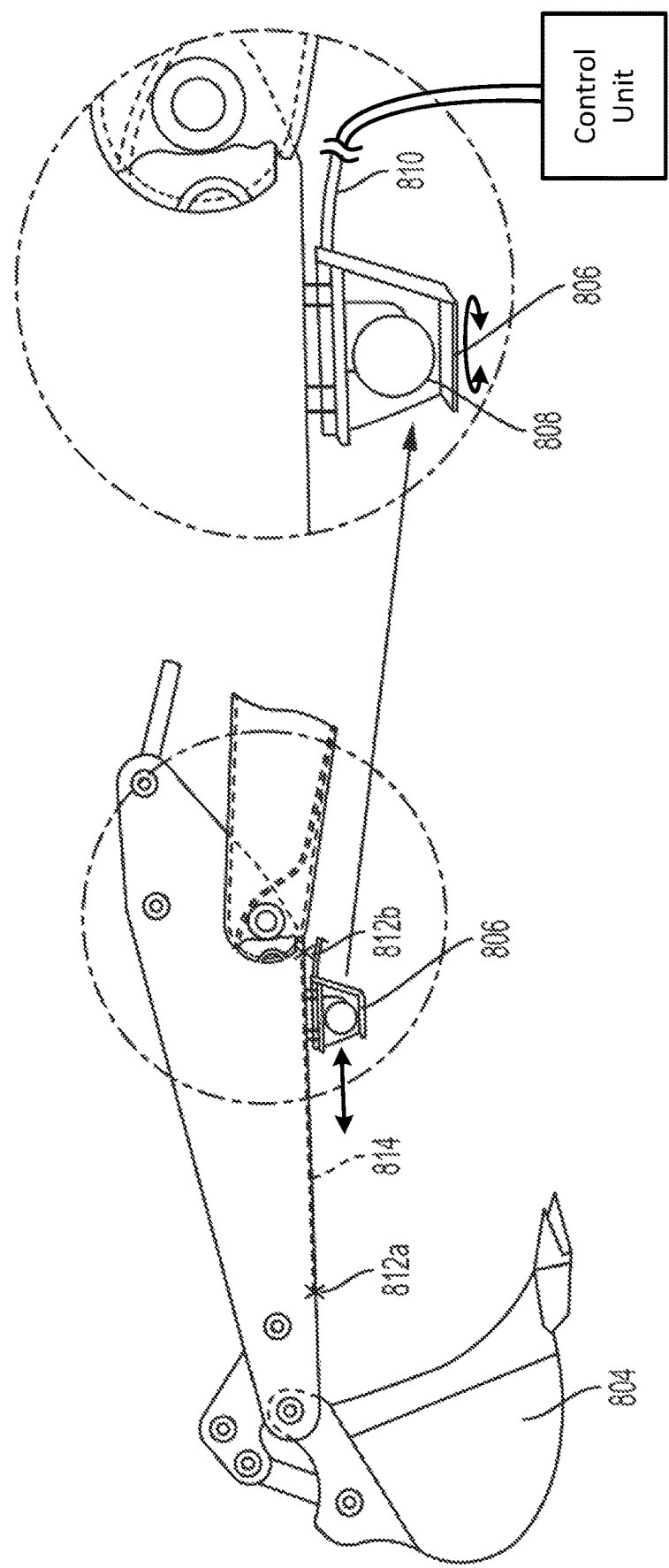
FIG. 8 shows an example of a portion of a vision system mounted on a work vehicle according to some aspects.

FIG. 8 shows an example of a portion of a vision system mounted on a work vehicle according to some aspects. In this example, a camera 808 of the vision system is mounted to a connector component 802 (e.g., a boom, dipper stick, arm, or any combination of these) between the main body of the work vehicle and the work tool 804. The camera 808 is mounted via a mounting device 806. The mounting device 806 can include a casing to protect the camera 808 from impacts, water, rain, heat, or any combination of these. The mounting device 806 can include mounting holes, screws, latches, cables, rails, or any combination of these for mounting the camera 808 to the work vehicle. In some examples, the mounting device 806 can accommodate multiple cameras (e.g., at different angles) for communicating multiple images to one or more displays, or cameras of different aperture angles.

The mounting device 806 can be permanently affixed in a particular location on the work vehicle or removably coupled to the work vehicle. For example, the mounting device 806 can be removably coupled to the connector component 802 such that the mounting device 806 can be removed, repositioned, and reattached to any point along the length of the connector component. This can enable the area captured by the camera 808 to be adjusted as desired.

The mounting device 806 can position an entire body of the camera 808 externally to a plane 814 (e.g., a continuous plane) that is defined by at least two points 812a-b on an external surface of the connector component 802. For example, the plane 814 can be between a first point 812a at one end of the external surface of a dipper stick and a second point 812b at another end of the external surface of the dipper stick. The mounting device 806 can position the entire body of the camera 808 below the plane, as shown in FIG. 8, or on the plane 814. In some examples, positioning the entire body of the camera 808 below the plane 814 can reduce or eliminate the need to cut holes into the connector component 802 in which to place the camera 808. This can help maintain the structural integrity of the connector component 802, which would otherwise be negatively impacted by the holes.

In some examples, the mounting device 806 can include a dampening material, such as rubber. The dampening material can reduce or prevent vibrations (e.g., resulting from the work vehicle 100 performing construction operations) from reaching and damaging the camera 808. Additionally or alternatively, a dampening material can be positioned between the mounting device 806 and the connector component 802 to reduce or prevent vibrations from reaching the camera 808. For example, the dampening material can be glued or otherwise affixed to a surface the connector component 802, and the mounting device can then be affixed to the dampening material.

In some examples, the mounting device 806 is electronically controlled and capable of physically rotating the camera 808, translating the camera 808, or both. The mounting device 806 can manipulate the physical positioning of the camera 808 in response to electrical signals from a control unit.

The control unit can be in communication with the mounting device 806 via a wired interface, such as wire 810, or a wireless interface. The control unit can be positioned in the cab of the work vehicle or elsewhere such that the control unit is accessible to the operator. In some examples, the display of the vision system can include the control unit. For example, the display can be a touch-screen display capable of receiving user input (e.g., zoom, pan, tilt, or other commands) and controlling the mounting device 806 accordingly. As another example, the display can include one or more buttons, switches, joysticks, or other manipulandums for receiving user input from the operator. The control unit can detect interaction with the manipulandum(s) and responsively control the mounting device 806 accordingly.

Figure 9:
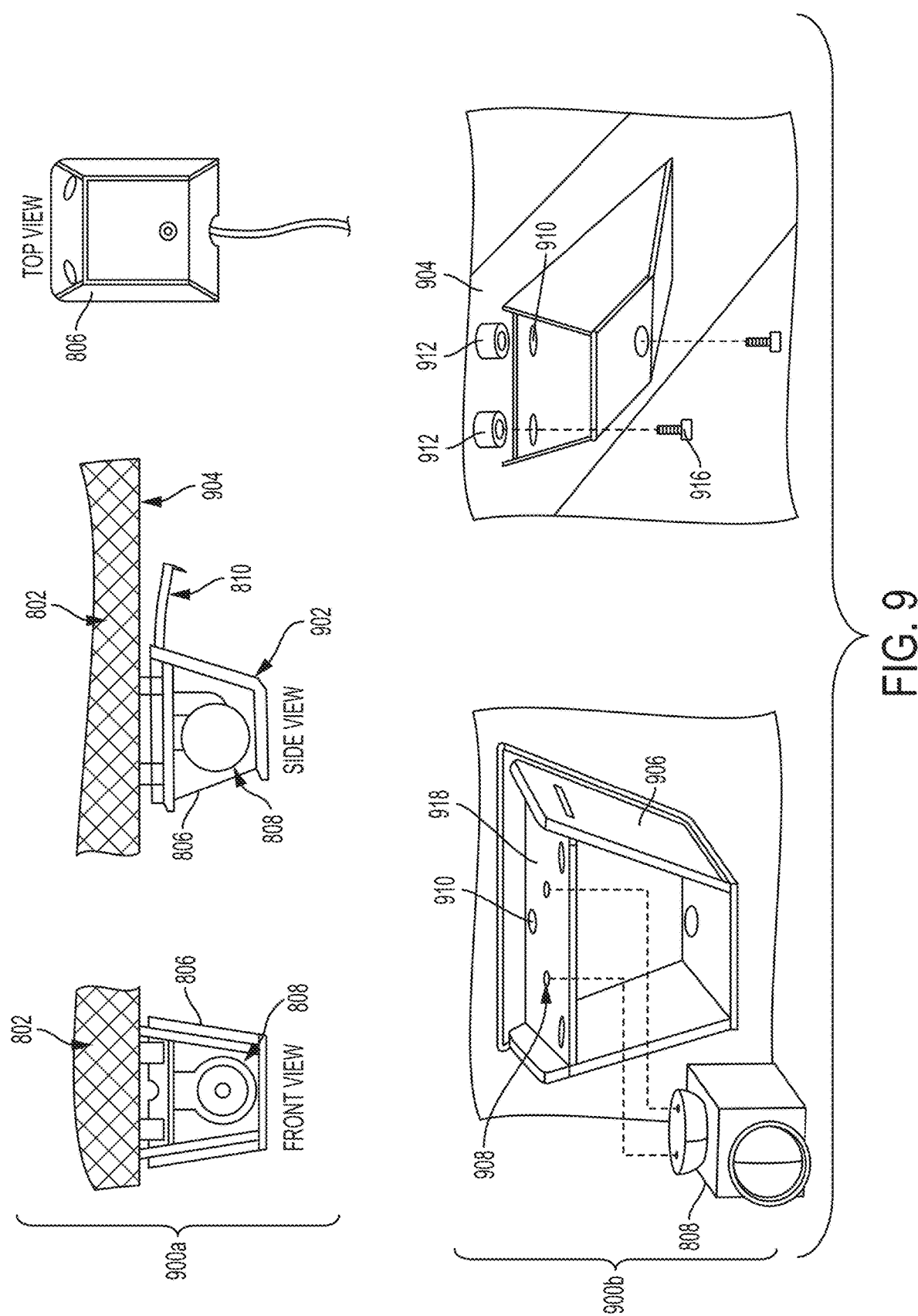
FIG. 9 shows examples of a mounting device according to some aspects.

Other examples of the mounting device 806 are shown in FIG. 9. The top half 900a of FIG. 9 shows a front, side, and top view of the mounting device 806 according to some aspects. The mounting device 806 can include a casing 902 for protecting the camera 808. The casing 902 can surround the camera 808 on at least three sides. In some examples, the mounting device 806 can include foam or another material for dampening vibrations, which can extend the life of the camera 808. The camera 808 can be attached to the mounting device 806, which in turn can be mounted to a surface 904 (e.g., a lower surface of a connector component 802).

The bottom half 900b of FIG. 9 shows another example of the mounting device 806. The mounting device 806 can include one or more side protective surfaces 906, which can protect the camera 808 from damage. The mounting device 806 can also include a mounting plate 918 for attaching the camera 808. The mounting plate 918 can include holes 908, screws, latches, or any combination of these for coupling with the camera 808. The mounting plate 918 can additionally or alternatively include holes 910, screws, latches, or any combination of these for coupling with the surface 904 of the work vehicle. For example, screws 916, nails, or other devices can be used to couple the mounting plate 918 to threaded studs 912 or other portions of the surface 904 via the holes 910.

Figure 10:
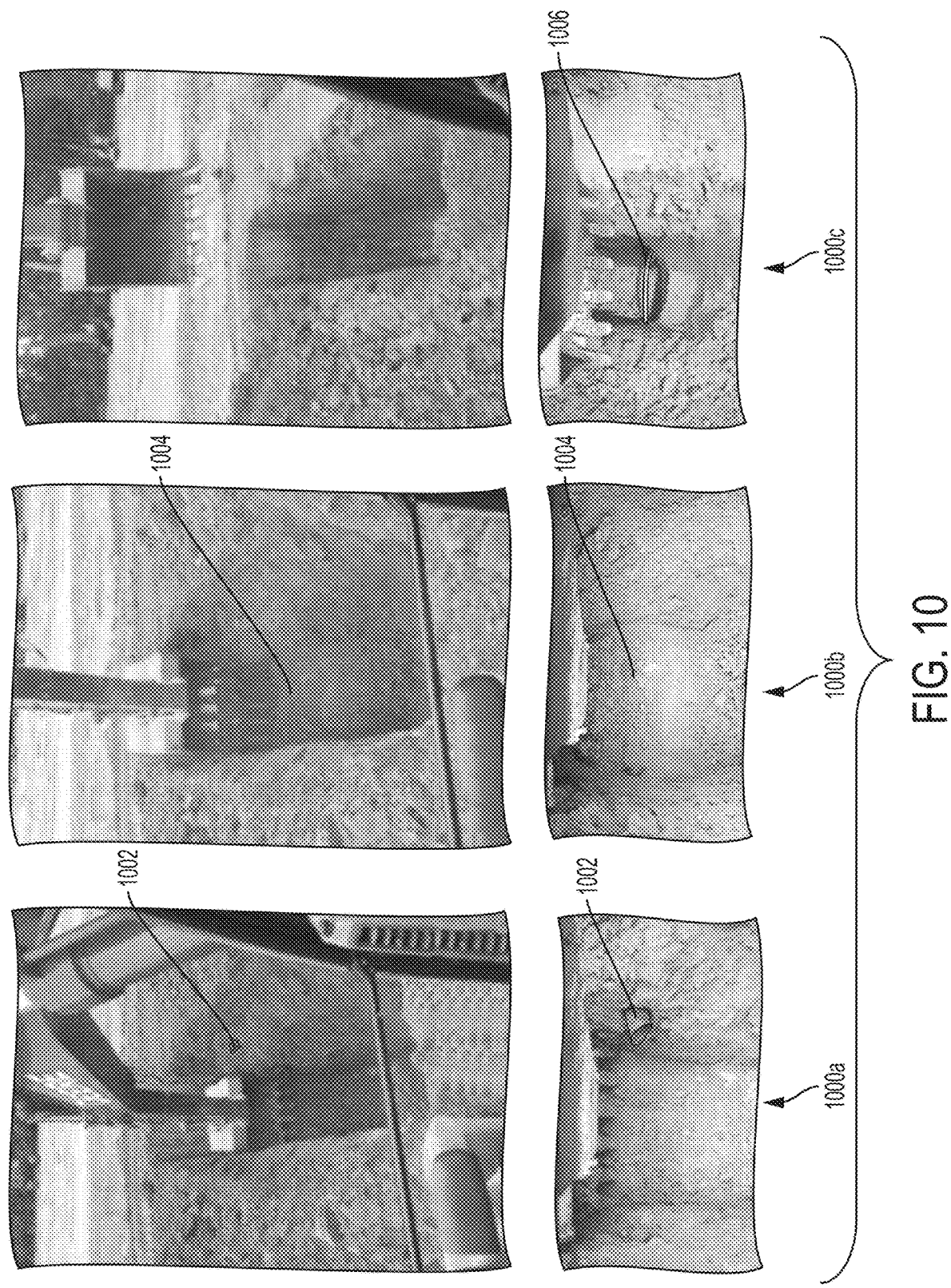
FIG. 10 shows examples of applications of the vision system according to some aspects.

FIG. 10 shows examples of applications of the vision system according to some aspects. FIG. 10 is divided into three example applications 1000a-c. In the first example application 1000a, a bucket being used to dig a ditch, as shown in the top half of the figure. A buried pipe 1002 in the ditch may be blocked from the operator's field of view or barely visible. But the operator may be able to more clearly see the buried pipe 1002 using a vision system of the present disclosure, which may provide the image shown in the bottom half of the figure via a display. Similarly, in the second example application 1000b, a ditch that contains a buried pipe 1004 that is barely visible, as shown in the top half of the figure. But the operator may be able to more clearly see the buried pipe 1004 using a vision system of the present disclosure, which may provide the image shown in the bottom half of the figure via a display. In the third example application 1000c, a bucket is moving toward a ditch (e.g., to scoop dirt to increase the size of the ditch), as shown in the top half of the figure. And a buried gas line 1006 is entirely blocked from the operator's field of view. But the operator can see the buried gas line 1006 using a vision system of the present disclosure, which may provide the image shown the bottom half of the figure via a display.

Figure 11:
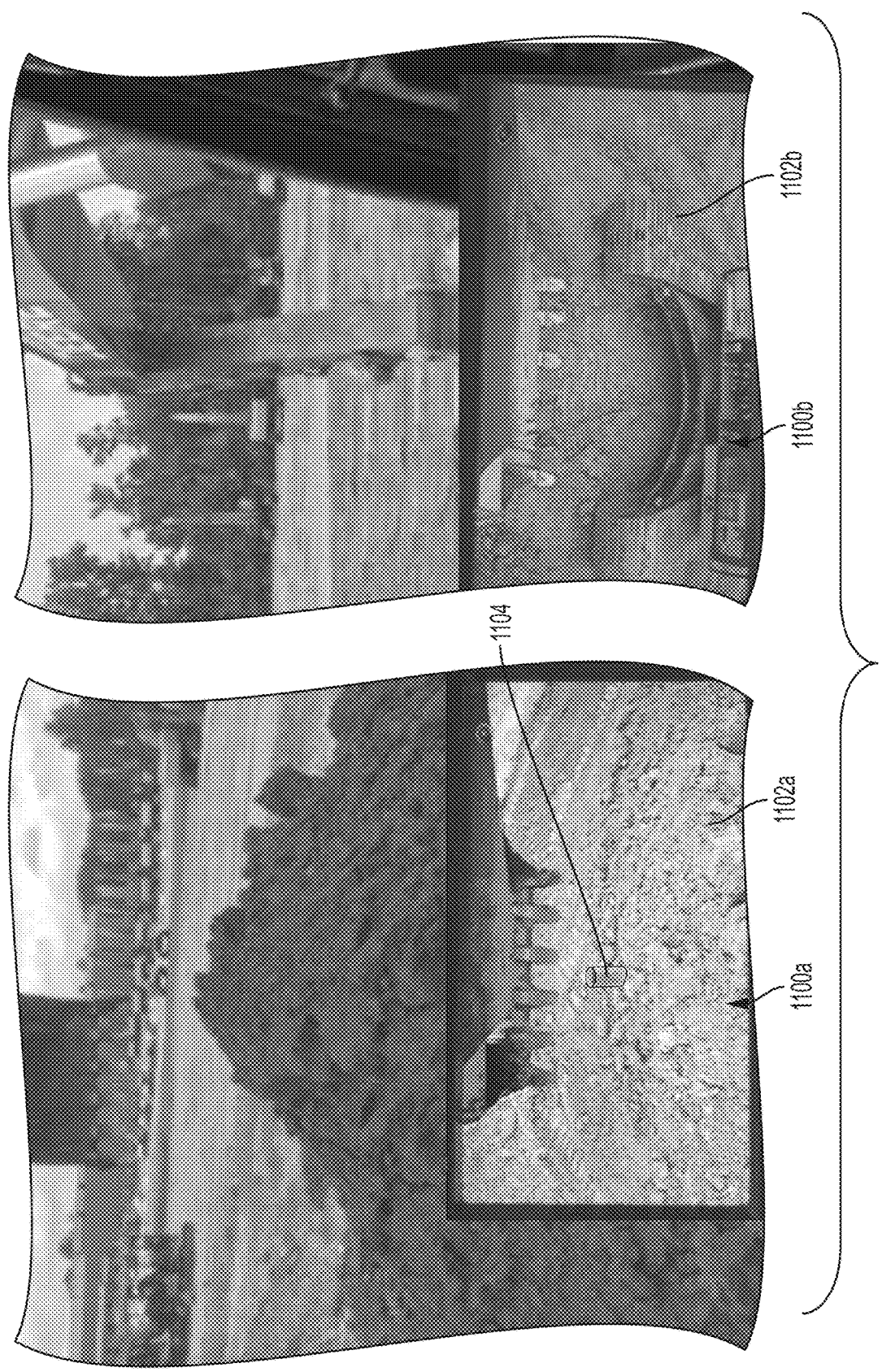
FIG. 11 shows additional examples of applications of the vision system according to some aspects.

FIG. 11 shows additional examples of applications of the vision system according to some aspects. The left portion 1100a of FIG. 11 shows a pile of dirt that is obstructing the operator's field of view, preventing the operator from directly seeing a pipe 1104 protruding from the ground. But the operator can see the pipe 1104 using a vision system of the present disclosure, which may provide image 1102a via a display. The right portion 1100b of FIG. 11 shows a dipper stick of an excavator at least partially curled for transport. A camera positioned on the dipper stick can transmit images, such as image 1102b, that show the sides of the work vehicle during transport. This can help prevent the sides of the work vehicle from accidentally hitting and damaging other objects during transport.

In some examples, the improved visibility of the work tool can enable the operator to identify and diagnose potential problems with the work tool or the work vehicle, such as missing or broken bucket teeth, oil leaks, damaged parts, hydraulic fluid leaks, or any combination of these. The improved visibility may also aid in training workers to use the work vehicle, for example, by helping trainees optimize the bucket angle during a dig cycle or the bucket curl in a trench.

Figure 12:
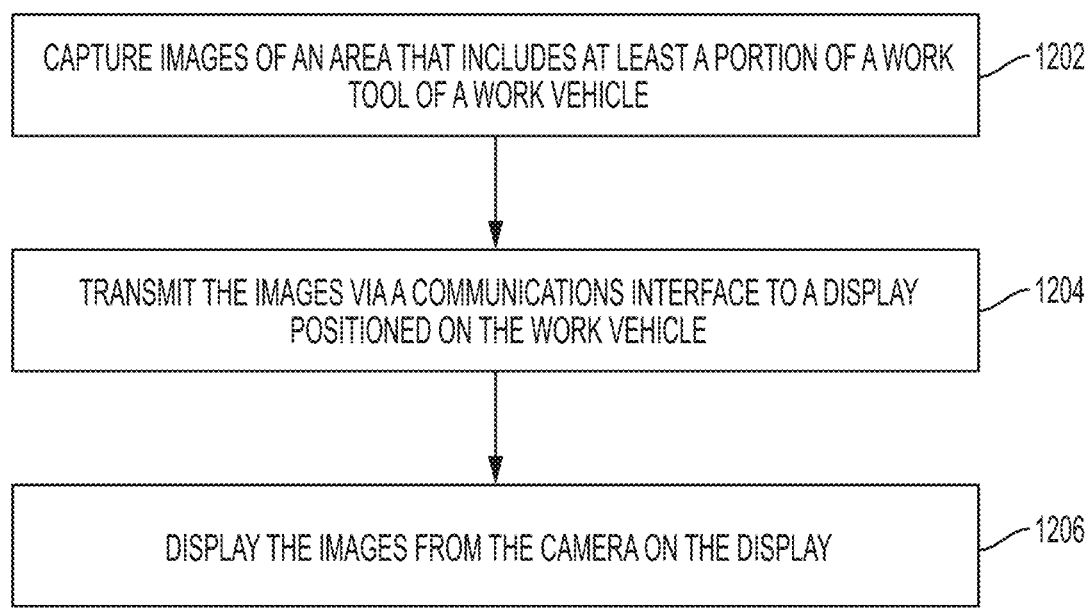
FIG. 12 is a flow chart of an example of a process for using the vision system according to some aspects.

FIG. 12 is a flow chart of an example of a process for using the vision system according to some aspects. Some examples can include more steps, fewer steps, different steps, or a different order of the steps than is depicted in FIG. 12. The steps below are described with reference to components described above with reference to FIGS. 1 and 8.

In block 1202, a vision system captures images or video of an area that includes at least a portion of a work tool 804 of a work vehicle 100. In some examples, the vision system can include a camera 808 positioned on an external surface of a connector component 802 of the work vehicle 100. The camera 808 can be oriented toward the work tool 804 to capture images or video that include at least a portion of the work tool 804. For example, the camera 808 can be oriented to capture some or all of a bucket for performing construction operations.

In block 1204, the vision system transmits images or video via a communications interface to a display, which can be positioned on the work vehicle 100 or elsewhere (e.g., remotely from the work vehicle 100). For example, the vision system can transmit the images wirelessly to the display via the communications interface. The display can also form part of the vision system.

In block 1206, the vision system displays the images from the camera 808 on the display. For example, the display can receive and output the images. The display can be positioned so as to be viewable by an operator of the work vehicle 100. For example, the display can be positioned in a cab of the work vehicle 100. This can enable the operator to monitor the area proximate to the work tool to prevent inadvertent damage to the work tool or other objects.

In some examples, an operator of the work vehicle 100 may wish to adjust the field of view of the camera 808 while the operator is sitting in the cab, for example, to get a different or better view of the end of the work tool 804. So, the operator can provide user input to a control unit that is configured to manipulate the positioning of the camera 808. The control unit can respond to the user input by transmitting an electrical signal to a mounting device 806 physically attaching the camera 808 to a component of the work vehicle 100. The mounting device 806 can, in turn, receive the electrical signal and adjust an orientation of the camera 808 in response to the electrical signal.

Figure 13:
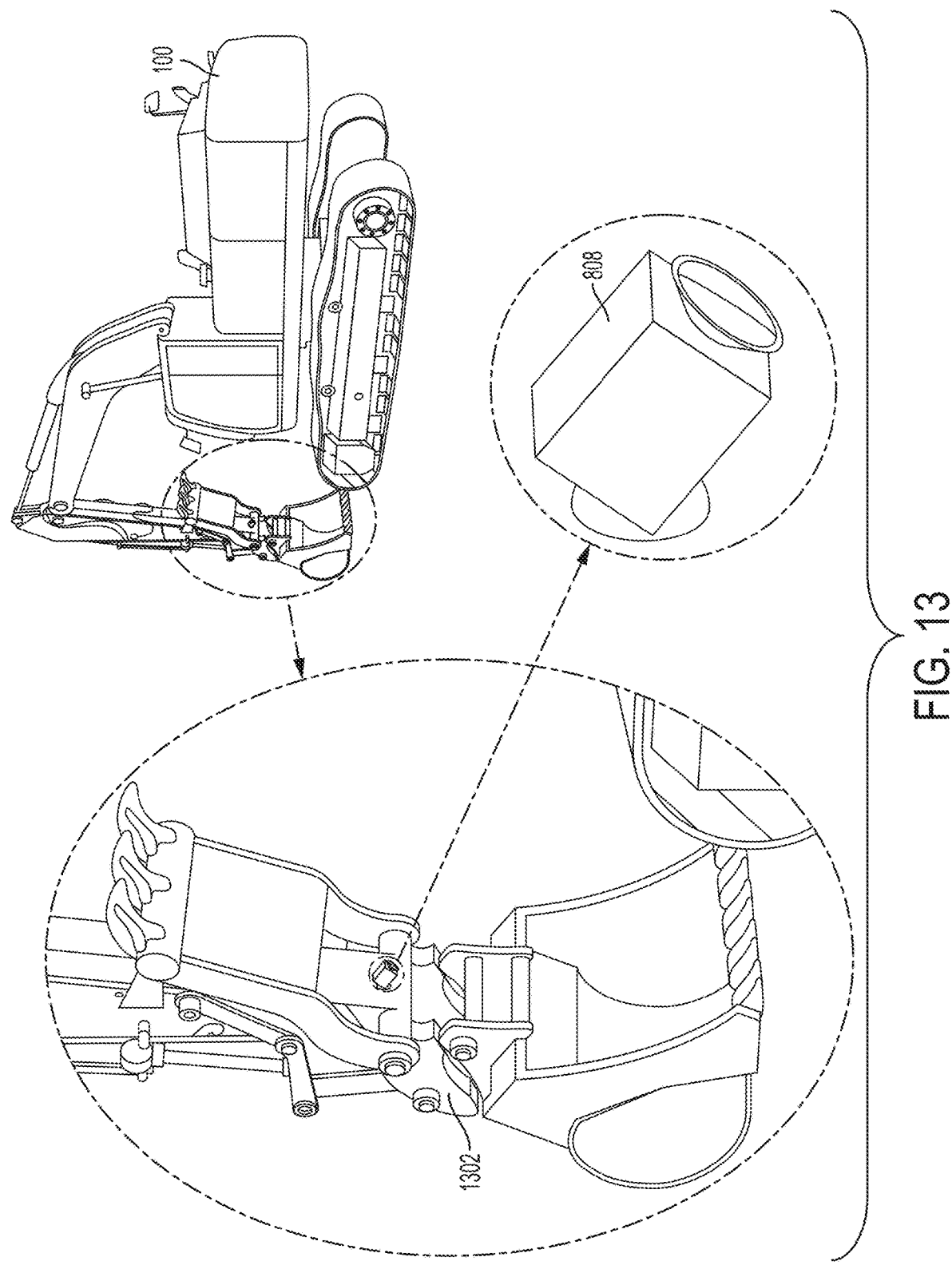
FIG. 13 shows another example of a portion of a vision system mounted proximate to an attachment of a work vehicle according to some aspects.

FIG. 13 shows another example of a portion of a vision system mounted proximate to an attachment 1302 of a work vehicle 100 according to some aspects. In this example, the attachment 1302 is a thumb. A camera 808 is positioned proximate to the thumb and oriented toward the thumb to capture an area that includes the attachment 1302. But other examples can involve other types of attachments 1302 (e.g., a coupler, shear, or breaker) and other positionings of the camera 808 relative to the attachments 1302.

Although the examples of the vision system are described herein as including a camera, other examples of the vision system can additionally or alternatively include other types of sensors for monitoring an area proximate to a work tool, such as depth sensors or range sensors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. Examples can be combined with other examples to yield additional examples.

The invention claimed is:

1. A work vehicle comprising:
a work tool coupled to a main body of the work vehicle by a connector component;
a camera configured to capture images of an area that includes at least a portion of the work tool and transmit the images, wherein the camera is positioned on an external surface of the connector component of the work vehicle;
a mounting device that couples the camera to the connector component and that is electrically controllable by a control unit for rotating and translating the camera, the mounting device being configured to translate the camera along a longitudinal axis of the connector component in response to electrical signals from the control unit to reposition the camera along the longitudinal axis; and
a display configured to receive the images from the camera and display the images, wherein the display is positioned to be viewable by an operator of the work vehicle.

2. The work vehicle of claim 1, wherein the work vehicle is an excavator, the work tool is an attachment, the connector component is a boom or a dipper stick, and the at least a portion of the work tool includes a bucket.

3. The work vehicle of claim 1, wherein the display is positioned in a cab of the work vehicle or on a rollover protection structure.

4. The work vehicle of claim 1, wherein the mounting device is configured for removably coupling the camera to the connector component, wherein the mounting device is configurable to adjust a location of the camera along the connector component.

5. The work vehicle of claim 1, wherein the mounting device is operable to adjust (i) an orientation of the camera, or (ii) a location of the camera along the connector component.

6. The work vehicle of claim 5, wherein the mounting device further comprises a dampening material that is positioned between the mounting device and the connector component for reducing vibration of the camera.

7. The work vehicle of claim 6, wherein the display is the control unit, and wherein the display includes a touch-screen display for receiving user input and responsively controlling the orientation or location of the camera.

8. The work vehicle of claim 1, wherein an entire body of the camera is positioned externally to the external surface of the connector component, and wherein a lens of the camera is oriented to capture images of the work tool.

9. The work vehicle of claim 8, wherein the entire body of the camera is positioned beneath a continuous plane between at least two points on the external surface of the connector component, wherein a first point of the at least two points is at a first end of the connector component and a second point of the at least two points is at a second end of the connector component, the second end being opposite to the first end.

10. The work vehicle of claim 1, wherein the camera is configured to transmit the images to the display via a wireless interface.

11. A vision system comprising:
a camera configured to capture images of an area that includes at least a portion of a work tool of a work vehicle and transmit the images, wherein the camera is positionable on an external surface of the work vehicle;
a display configured to receive the images from the camera and display the images, wherein the display is positionable so as to be viewable by an operator of the work vehicle; and
a mounting device configured to mount the camera to the external surface of the work vehicle, wherein the mounting device is electronically controllable by a control unit for rotating and translating the camera, the mounting device being configured to translate the camera along an axis of the external surface in response to electrical signals from the control unit to reposition the camera along the axis.

12. The vision system of claim 11, wherein the work vehicle is an excavator, the work tool is an attachment, and the at least a portion of the work tool includes a bucket.

13. The vision system of claim 11, wherein the mounting device is configured for removably coupling the camera to a connector component of the work vehicle, wherein the mounting device is configurable to adjust a location of the camera along the connector component.

14. The vision system of claim 11, wherein the mounting device is operable to adjust (i) an orientation of the camera, or (ii) a location of the camera along a connector component between the work tool and a body of the work vehicle.

15. The vision system of claim 14, wherein the mounting device further comprises a dampening material that is positionable between the mounting device and the connector component for reducing vibrations of the camera.

16. The vision system of claim 15, wherein the display is the control unit, and wherein the display includes a touchscreen display for receiving user input and responsively controlling the orientation of the camera.

17. The vision system of claim 11, wherein an entire body of the camera is positioned externally to an external surface of a connector component that is positioned between the work tool and a body of the work vehicle.

18. The vision system of claim 17, wherein the entire body of the camera is positioned beneath a continuous plane between at least two points on the external surface of the connector component, wherein a first point of the at least two points is at a first end of the connector component and a second point of the at least two points is at a second end of the connector component, the second end being opposite to the first end.

19. A method comprising:
capturing images, by a camera positioned on an external surface of a work vehicle, of an area that includes at least a portion of a work tool of the work vehicle;
transmitting, by the camera, the images via a communications interface to a display positioned on the work vehicle so as to be viewable by an operator of the work vehicle;
receiving and displaying, by the display, the images from the camera; and
rotating and translating the camera by a mounting device that couples the camera to a connector component of the work vehicle in response to electrical signals from a control unit, wherein translating the camera involves moving the camera along a longitudinal axis of the connector component to reposition the camera along the longitudinal axis.

20. The method of claim 19, further comprising:
transmitting, by the control unit, an electrical signal to the mounting device that is physically attaching the camera to the connector component between the work tool and a body of the work vehicle;
reducing, by a dampening material positioned between the mounting device and the connector component, vibrations of the camera;
receiving, by the mounting device, the electrical signal; and
adjusting, by the mounting device, an orientation of the camera in response to the electrical signal.

* * * * *